(12) United States Patent
Regupathy et al.

(10) Patent No.: US 11,169,589 B2
(45) Date of Patent: Nov. 9, 2021

(54) MANAGING SYSTEM POWER IN USB-C/USB POWER DELIVERY SYSTEMS

(71) Applicant: Intel Corporation, Santa Clara, CA (US)

(72) Inventors: Rajaram Regupathy, Bangalore (IN); Abdul R. Ismail, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 231 days.

(21) Appl. No.: 16/235,867

(22) Filed: Dec. 28, 2018

(65) Prior Publication Data

US 2019/0138078 A1    May 9, 2019

(51) Int. Cl.
| | |
|---|---|
| *G06F 1/32* | (2019.01) |
| *G06F 1/3234* | (2019.01) |
| *G06F 13/42* | (2006.01) |
| *G06F 1/3228* | (2019.01) |
| *G06F 1/3296* | (2019.01) |

(52) U.S. Cl.
CPC .......... *G06F 1/3253* (2013.01); *G06F 1/3228* (2013.01); *G06F 1/3296* (2013.01); *G06F 13/4282* (2013.01); *G06F 2213/0042* (2013.01)

(58) Field of Classification Search
CPC ..................................... G06F 1/32; G06F 1/26
See application file for complete search history.

(56) References Cited

U.S. PATENT DOCUMENTS

| | | | |
|---|---|---|---|
| 10,338,656 B1* | 7/2019 | Nayak | G06F 13/385 |
| 2010/0275037 A1* | 10/2010 | Lee | G06F 13/385 713/189 |
| 2013/0159559 A1* | 6/2013 | Hess | G06F 13/385 710/14 |
| 2016/0378704 A1* | 12/2016 | Adamson | G06F 13/385 710/104 |
| 2017/0046289 A1* | 2/2017 | Hundal | G06F 13/4022 |
| 2018/0143916 A1* | 5/2018 | Gupta | G06F 13/385 |
| 2018/0254648 A1* | 9/2018 | Harju | H02J 7/045 |
| 2019/0042503 A1* | 2/2019 | Montero | G06F 13/4282 |
| 2019/0185324 A1* | 6/2019 | Hundal | H04N 21/43632 |
| 2020/0184921 A1* | 6/2020 | Yong | G06F 3/0482 |

* cited by examiner

*Primary Examiner* — Phil K Nguyen
(74) *Attorney, Agent, or Firm* — Schwabe, Williamson & Wyatt, P.C.

(57) ABSTRACT

Embodiments are directed toward a universal serial bus (USB) controller including a USB Type-C port that couples to a USB Type-C link including high speed data lines and an alternate mode function line to carry low power commands related to an alternate mode function. In embodiments, the controller or a processor coupled to the controller monitors the line used by the alternate mode function for the low power commands and provides information about the low power commands to a device policy manager (DPM) to determine a power distribution policy for a plurality of devices coupled to the DPM. In embodiments, the power distribution policy supplements or replaces a low power policy of a device of using a USB-C/Power delivery policy and another device using an alternate mode low power policy. Other embodiments may be described and/or claimed.

7 Claims, 7 Drawing Sheets

Non-transitory computer-readable storage medium 702

Programming Instructions 704
configured to cause a computing device, in response to execution of the programming instructions, to practice one or more operations of the methods described in reference to Figures 2, 4, and 5.

FIG. 7

MANAGING SYSTEM POWER IN USB-C/USB POWER DELIVERY SYSTEMS

FIELD

Embodiments of the present disclosure generally relate to the field of computing, and more specifically to managing power resources in a USB-C/USB Power Delivery (PD) System.

BACKGROUND

Universal Serial Bus (USB) has evolved over more than a decade as a ubiquitous interface for connecting peripherals to a computing system. The USB port, which used to be primarily for low power devices and data transfer, has evolved to add capabilities of power deliver (PD) of up to 100 Watts, and supporting different protocols and high speed data over the same port, called the USB Type-C ("USB-C") port. The USB-C cables and connectors connect to both hosts and devices. The USB-C cable can be connected in either direction between a host and a device. In addition, note that devices may be hosts (e.g., DFP: Downstream-facing port) or peripherals (UFP: Upstream-facing port). These new capabilities are defined in the specifications of the USB Type-C (or "USB-C") Cable and Connector Specification 1.3 and USB Power Delivery (PD) Specification 3.0. Additional functions referred as "Alternate Modes" like DisplayPort, High Definition Multimedia Interface (HDMI), Thunderbolt, Peripheral Component Interconnect (PCI), etc. over the USB-C port are defined by respective organizations on how to use available USB-C ports for the respective functionalities. The specifications define devices which are Dual Role Power (DRP) which can Source and Sink power and Dual Role Data (DRD) which can act as host and device for data.

A configuration process is typically carried out over a Configuration Channel (CC) signal line between a host and a peripheral device to determine connection and orientation detection as well as initial power and data roles. For negotiation by the power Source and Sink for power of up to 100 W (20V/5 A), the Source and Sink uses a protocol negotiation defined by the USB PD specification. There is an additional power source on the CC line, namely $V_{conn}$, with a range of 3.0V to 5.5V with a maximum of 1 W. Over and above these ranges, the USB Type-C Alternate Mode specifications define power characteristics. Note that low power definitions and requirements vary for different specifications associated with different devices. Additionally, the information related to power states may be scattered in different modules. For example, the USB Type-C specification 3.1, USB PD Specification 3.0, and USB Type-C Alternate Mode DisplayPort 1.4 Specification do not define procedures to share low power state status to a Device Policy Manager (DPM).

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments of the present disclosure are directed toward apparatuses, methods, and systems for managing power resources in a USB-C/USB Power Delivery (PD) system. In embodiments, a universal serial bus (USB) controller includes a USB Type-C ("USB-C") port to be coupled to a USB-C link that includes high speed data lines and one or more lines used by an alternate mode function to carry low power commands related to an alternate mode function. According to embodiments, a processor coupled to the USB-C port monitors the line used by the alternate mode function for the low power commands and provides information about the low power commands to a device policy manager (DPM). In embodiments, the DPM determines a power distribution policy for a plurality of devices coupled to the DPM. In embodiments, the power distribution policy is to supplement or replace a low power policy of at least a first device of the plurality of devices using a USB-C/Power delivery policy and/or a second device of the plurality of devices that uses an alternate mode low power policy. Other embodiments may be described and/or claimed.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

Figure 1:
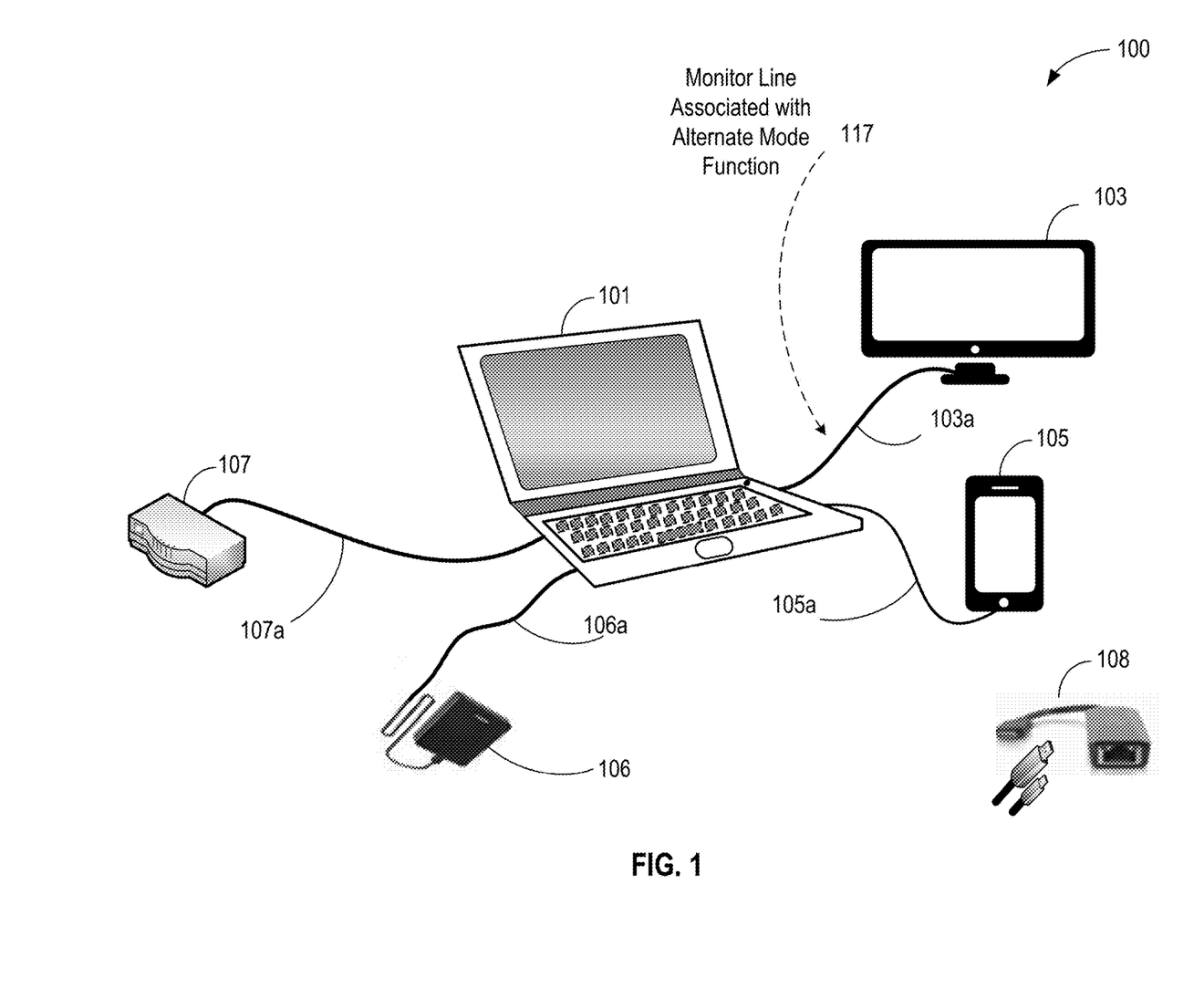
FIG. 1 illustrates an example environment associated with a USB-C/Power delivery policy, according to embodiments of the present disclosure.

As noted above, embodiments of the present disclosure assist a Device Policy Manager (DPM), e.g., a USB Power Delivery (PD) DPM, to assist in efficiently and effectively manage available power in, e.g., a hybrid USB-C/USB Power Delivery environment or ecosystem. FIG. 1 illustrates an example multiport ecosystem 100 where power delivery of one more USB-C devices is governed by or associated with a default or standard USB-C/Power delivery policy and at least one other USB-C device is governed by an alternate mode low power policy. In embodiments, the alternate mode low power policy is associated with an alternate mode of the one or more high speed data lines to carry high-speed signals different from default USB 3.0 signals. As shown, multiport ecosystem 100 includes a host device, e.g., laptop 101, coupled to a plurality of peripheral USB-C devices via respective USB-C links, e.g., a display 103 via USB-C link 103a, mobile device 105 (e.g., tablet, mobile phone, and the like) via USB-C link 105a, external storage drive 106 via USB-C link 106a, and router 107 via USB-C link 107a.

In multiport ecosystem 100, three of the USB-C devices and, e.g., mobile device 105, external storage drive 106, and router 107 include USB-C ports that are governed by or associated with a USB-C/Power delivery policy (e.g., USB Power Delivery (PD) Specification 3.0 and/or in conjunction with USB Type-C (USB-C) Cable and Connector Specification 1.3), while one device, e.g., via display 103 and USB-C link 103a may be governed by or associated with a DisplayPort (DP) alternate mode. For example, in embodiments, USB-C link 103a includes one or more high speed data lines that transmit DisplayPort (DP) video and a line used by an alternate mode function, e.g., line 117 (also USB-C link 103a), to carry low power commands related to the alternate mode function. In embodiments, as will be discussed further below with respect to FIG. 2, a USB-C controller of a USB-C port in one or more of example devices 101-107 are incorporated with the technology of the present disclosure to efficiently and effectively manage power resources, including monitoring a line (e.g., at 117) used by the alternate mode function for the low power commands. Note that DisplayPort (DP) is merely an example of an alternate mode and High-Definition Multimedia Interface (HDMI), Thunderbolt, or other vendor alternate mode(s) are also contemplated.

Note that in other embodiments, the plurality of devices in multiport ecosystem 100 may be coupled to one another via any suitable configuration, such as for example, a daisy chain configuration (not shown). Furthermore, note that laptop 101, display 103, mobile device 105, external storage drive 106, and router 107 are merely example devices and in various embodiments include any suitable USB-C devices that can be coupled to a USB-C link to receive or transmit power and/or data in a hybrid USB-C/USB Power Delivery ecosystem. In embodiments, USB-C links may include USB—C type connectors and plugs, e.g., at 108.

Figure 2:
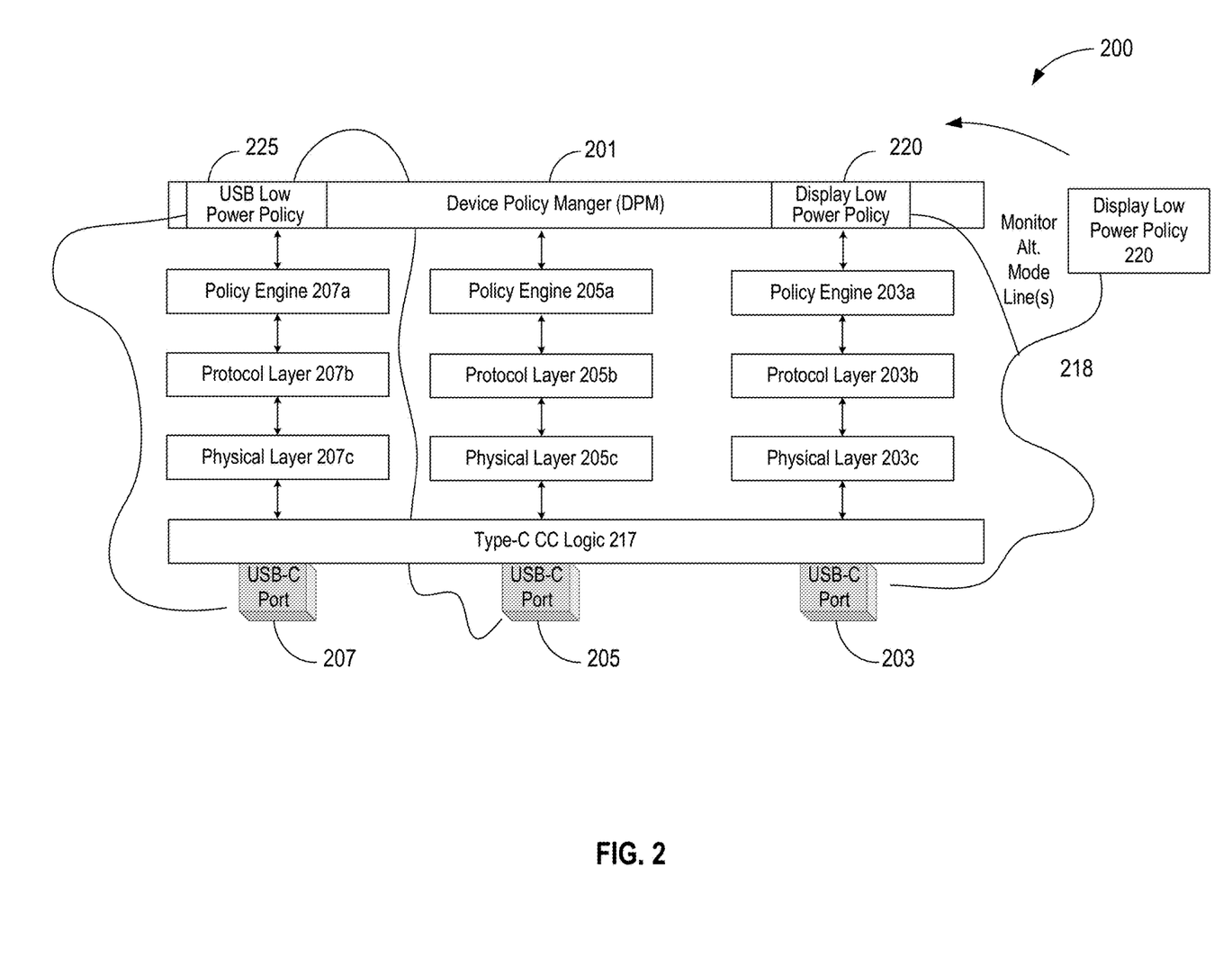
FIG. 2 is a block diagram associated with a plurality of USB-C ports and a device policy manager (DPM), according to embodiments of the present disclosure.

FIG. 2 is a communication stack diagram 200 including internal device policy blocks associated with USB-C ports 203, 205, and 207 coupled to a device policy manager (DPM) 201, suitable for use in the one or more of example devices 101-107 of FIG. 1, according to embodiments of the present disclosure. In embodiments, DPM 201 determines a power distribution policy for a plurality of devices to be coupled to DPM 201 via respective USB-C ports 203, 205, and 207. In embodiments, the determined power distribution policy is to supplement or replace a low power policy of at least a first device of the plurality of devices using a USB-C/Power delivery policy and a second device of the plurality of devices using an alternate mode low power policy. As shown, in embodiments, each of USB-C ports 203, 205, and 207 includes configuration channel (CC) logic 217 coupled via an example communication stack to DPM 201 (see FIG. 3 for additional discussion on configuration channel). In embodiments, each of USB-C ports 203, 205, and 207 includes its own respective policy engine 203a, 205a, and 207a to implement a power policy, e.g., low power policy, for each respective USB-C port 203, 205, and 207. In embodiments, respective policy engines 203a, 205a, and 207a communicate with respective protocol layers 203b, 205b, and 207b to enable messages to be exchanged via respective physical layers 203c, 205c, and 207c for handling transmission and reception of bits for respective USB-C links. In embodiments, USB-C ports 205 and 207 are associated with respective devices, for example, one or more of mobile device 105, external storage drive 106, or router 107 using or governed by a USB-C/Power delivery policy, e.g., USB low power policy 225. In embodiments, USB-C port 203 is included or coupled to a device (e.g., display 103) using or governed by an alternate mode low power policy, e.g., a display low power policy 220 (e.g., as may be included in USB Type-C Alternate Mode DisplayPort 1.4 Specification or other alternate mode policy). In embodiments, a processor is coupled to USB-C port 203 to monitor a line 218 used by an alternate mode function to carry low power commands related to the alternate mode function of the USB-C port. In embodiments, the processor is to provide information about the low power commands to DPM 201 so that it may consider display low power policy 220 which may include low power information gathered by monitoring line 218 along with USB low power policy 225 to determine a power distribution policy for the plurality of devices to be coupled to the DPM.

Note that although only two USB-C ports governed by a USB-C/Power delivery policy and one USB-C port governed by an alternate mode low power policy are shown in FIG. 2, the number of devices (e.g., hosts and peripherals for data and power) includes any suitable combination and number of devices that can be coupled together in a USB-C/USB Power Delivery ecosystem.

Figure 3:
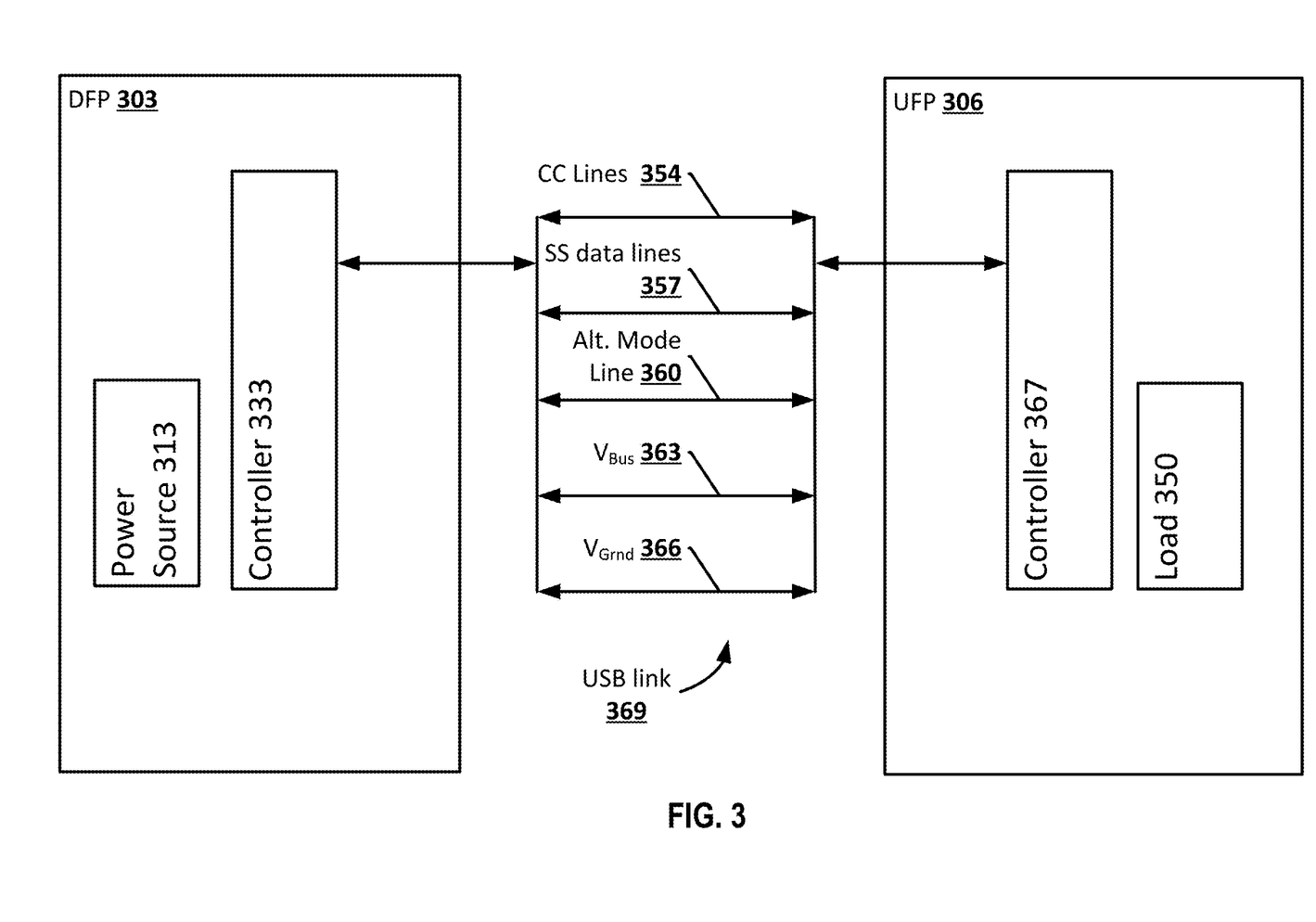
FIG. 3 illustrates an example downward facing port (DFP) device and upward facing port (UFP) device connected to one another via a USB link, according to embodiments of the present disclosure.

FIG. 3 illustrates example an example downward facing port (DFP) device 303 (power Source) and upward facing port (UFP) device (power Sink) 306 connected to one another via a USB link 369, according to various embodiments. DFP device 303 and UFP device 306 may be any one of example devices 101-107 of FIG. 1. In embodiments, DFP device 303 includes a controller 333 (e.g., USB Type-C controller and/or power device (PD) controller) and a power source 313 and UFP device 306 includes a controller 367 and a load 350. In embodiments, the signals transmitted or received via the USB link 369 may include one or more power signals, data signals, control signals, or some other type of signal. Note that USB link 369 may include additional lines that for simplification purposes are not presented in FIG. 3. The USB link 369 may be, include, or be a subset of the USB SS link, for example, in accordance with the USB Power Delivery (PD) Specification 3.0 and/or in conjunction with USB Type-C (USB-C) Cable and Connector Specification 1.3. The USB link 369 may include a plurality of lines. For example, the USB link 369 may include configuration channel (CC) lines 354, SuperSpeed data lines 357, one or more lines used by an alternate mode function (Alternate Mode line(s) 360), bus voltage line VBus 363 and a ground voltage line VGnd 366. VBus 363 and VGnd 366 may be configured to carry voltage between the (DFP) device 303 and (UFP) device 306. In embodiments, controller 333 monitors power commands of an alternate mode on Alternate Mode line 360 to gather low power state information. In embodiments, Alternate Mode line 360 is a side-band use (SBU) or auxiliary line in USB link 369. As touched on above, the CC is a dedicated channel of a USB Type-C cable on which an upstream-facing port (UFP) and a downstream-facing port (DFP) negotiate a power contract between two connected devices. Further as noted above, in embodiments, a data host may be a power Sink but may sometimes be a power Source (and vice-versa).

Figure 4:
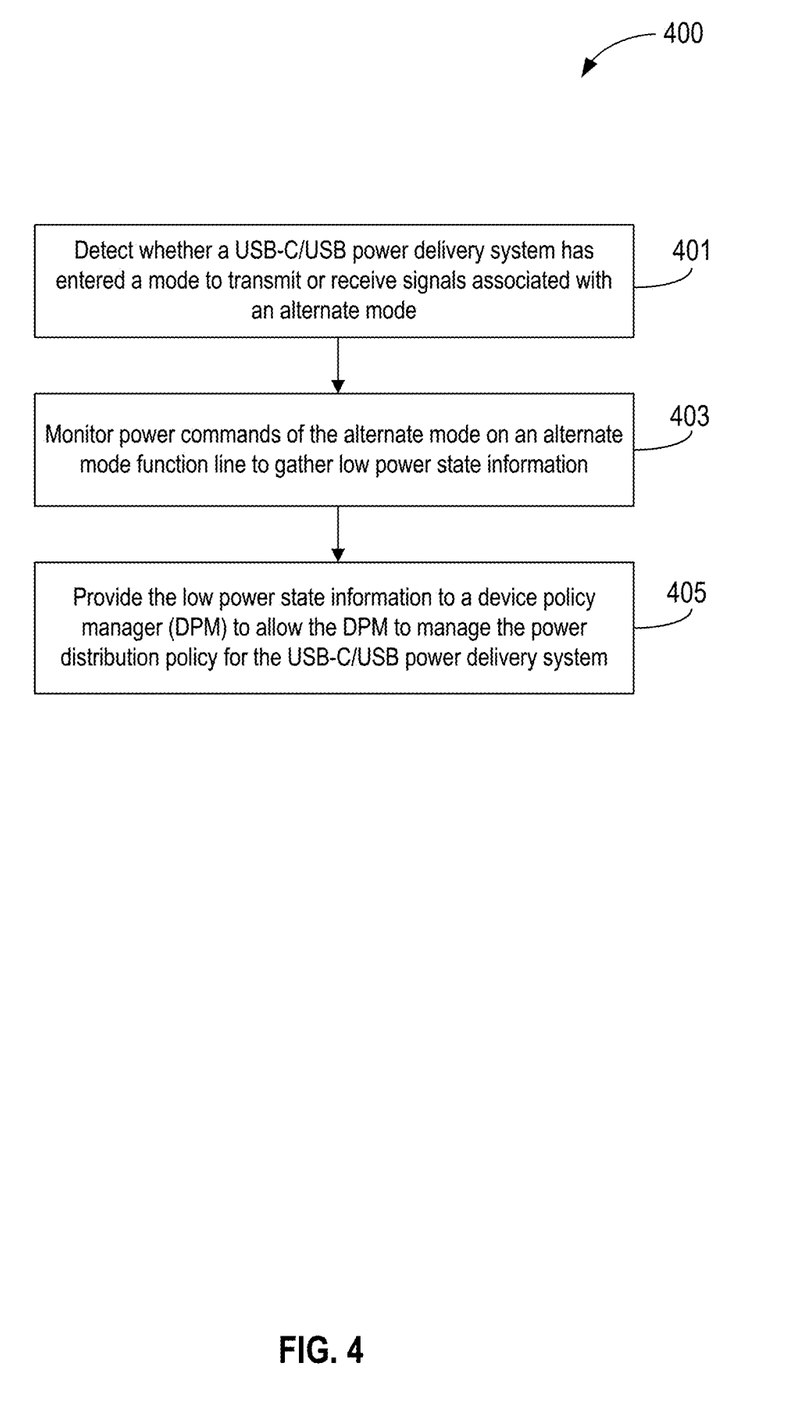
FIGS. 4 and 5 are flow diagrams illustrating methods associated with determining a power distribution policy, according to embodiments of the present disclosure.

To further illustrate, FIG. 4 depicts a method 400 associated with embodiments of the present disclosure. Method 400 may be practiced by any one of example devices 101-107 of FIG. 1. In embodiments, at a block 401, a USB controller (e.g., controller 333) detects whether a power delivery system, e.g., a USB-C/USB power delivery system, has entered a mode to transmit or receive signals associated with an alternate mode. For example, in embodiments, a USB controller detects that a USB-C port has entered a DisplayPort (DP), High-Definition Multimedia Interface (HDMI), Thunderbolt, or other vendor alternate mode. At a next block 403, in embodiments, the USB controller monitors power commands of the alternate mode on an alternate mode function line to gather low power state information. In embodiments, for example, the USB controller monitors a side-band use (SBU) or auxiliary line in a corresponding USB link for low power entry or exit commands. In various embodiments, the USB controller monitors the alternate function line by checking a hardware register or detecting an interrupt indicating entry or exit of low power states. In some embodiments, the USB controller, monitors power commands of the alternate mode by soft methods including callback registration. Next, at a block 405, the USB controller provides the low power state information to a DPM, e.g., DPM 201 of FIG. 2, to allow the DPM to manage the power distribution policy for the USB-C/USB power delivery system. Note that in embodiments, the USB controller provides the low power state information to the device policy manager (DPM) to allow the DPM to change a power requirement for a device of the plurality of devices or renegotiating a power contract with the device.

Figure 5:
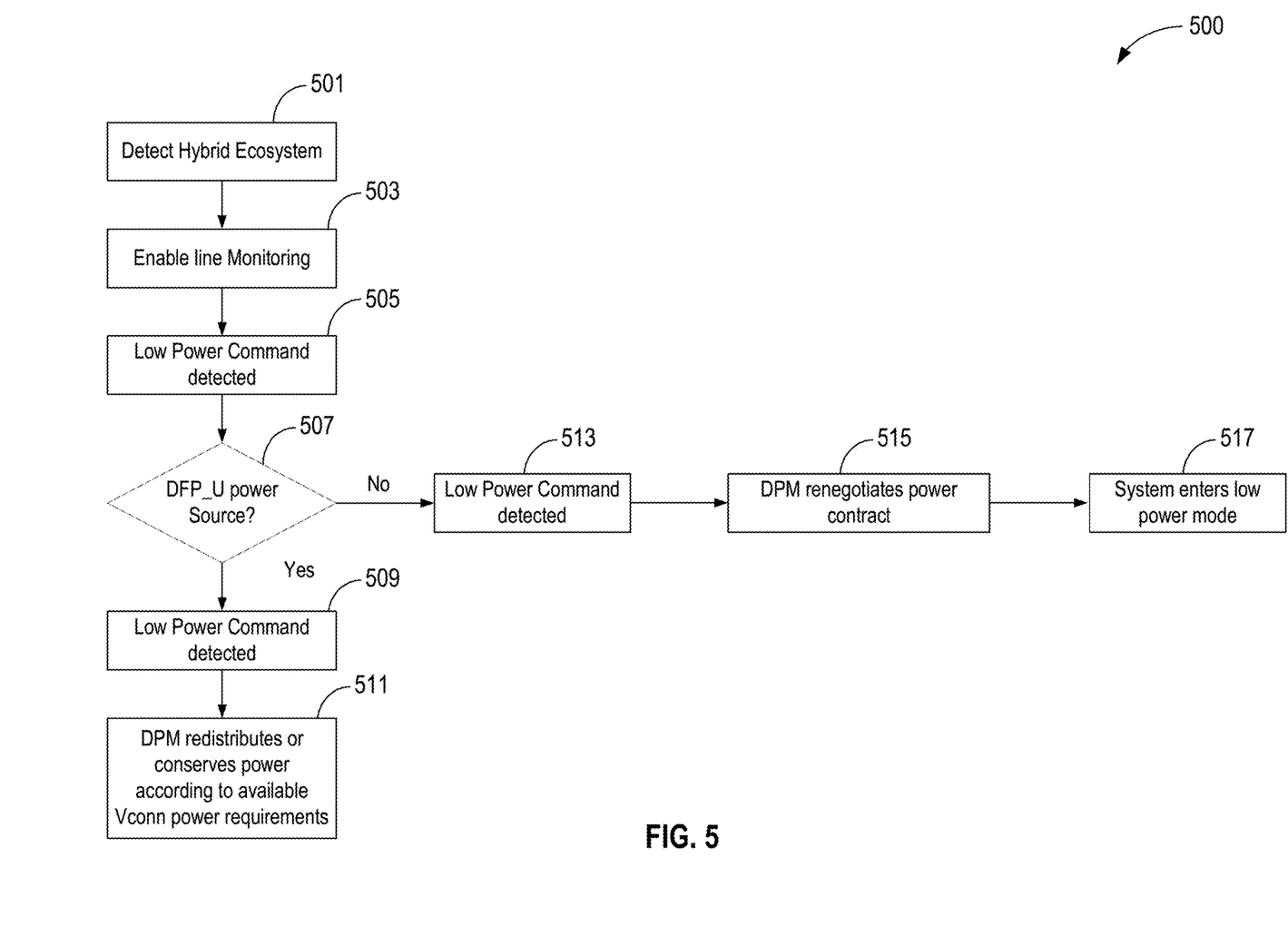

FIG. 5 is a flow diagram illustrating a method 500 that depicts an embodiment including a method associated with determining a power distribution policy to supplement or replace a low power policy of at least a first device of the plurality of devices using a USB-C/Power delivery policy and a second device of the plurality of devices using an alternate mode low power policy. Method 500 may be practiced by any pair of example devices 101-107 of FIG. 1. In embodiments, beginning at a block 501, a USB controller may detect a hybrid USB-C/USB Power Delivery ecosystem. In embodiments, the USB controller detects, e.g., on a configuration channel (CC) that a USB-C port has entered an alternate mode and subsequently USB controller notifies the DPM of the alternate mode status. At a next block 503, for the embodiment, the DPM enables or instructs the USB controller to enable line monitoring. In embodiments, the DPM enables line monitoring via hard or soft methods, e.g., as discussed with respect to FIG. 3. At a next block 505, the USB controller detects a low power command. In embodiments, low power commands may include commands indicating entry or exit of a low power state of a device. At a decision block 507, the DPM via the USB controller checks whether the low power commands are associated with a Host or Display Source (e.g., "DFP_U" (Display Source) in FIG. 5) that is concurrently a power Source. In embodiments, if the answer is YES, under methods associated with detecting low power commands for a DFP_U, a low power command state is detected at block 509. Accordingly, at a next block 511, the DPM redistributes or conserves power according to available power Source $V_{conn}$ power requirements. Accordingly, in embodiments, if a USB port comprises a data downstream facing port (DFP) and the power source, the USB controller to assists the DPM in changing a power requirement for the first and/or the second device. Note that in the alternative, returning to decision block 507, if the answer is NO, low power commands are associated with a Host or Display Source (DFP_U for Display Source) that is concurrently a power Sink, rather than a Source. Accordingly, in embodiments, a low power command is detected at block 513. At a next block 515, the DPM renegotiates a power contract with the power Source, e.g., according to a USB-C suspend policy. At a final block 517, the system enters a low power mode.

Note that FIG. 5 is merely an example associated with providing by the USB controller, low power state information to a DPM to manage the power distribution policy where the DPM is coupled to at least a first device associated with a default USB-C/Power delivery policy and a second device associated with a default alternate mode low power policy. Accordingly, details associated with renegotiating a power contract and/or determination of whether the system enters a low power mode will vary according to USB-C/Power delivery policy and a default alternate mode low power policy.

Figure 6:
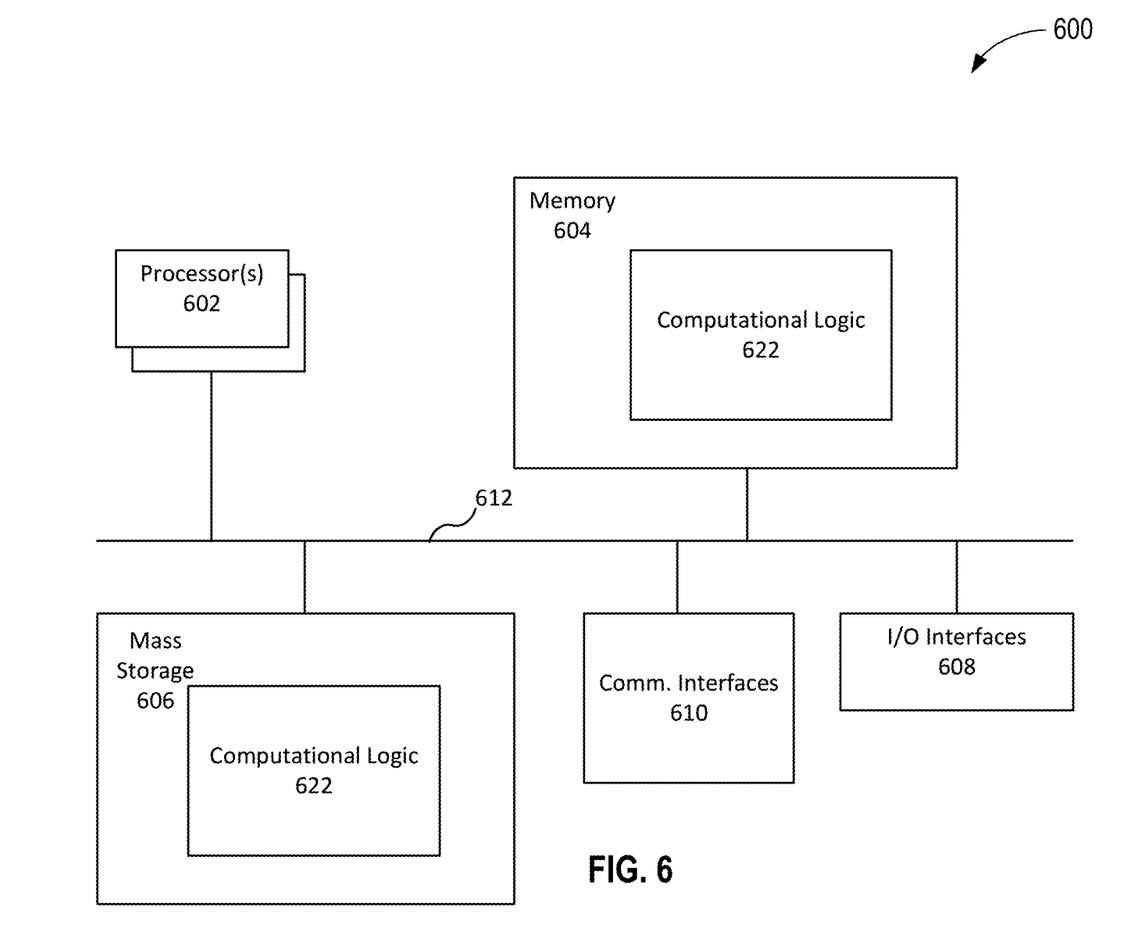
FIG. 6 illustrates an example computing device, in accordance with various embodiments.

FIG. 6 illustrates an example computing device 600 suitable for use as some of example device 101-107 of FIG. 1, in accordance with various embodiments. Specifically, in some embodiments, the computing device 600 may be a device that includes the USB-C controller of the present disclosure or a host device including a system DPM of the present disclosure, e.g., DPM 201. In various embodiments, the included USB controller of the present disclosure, for example implemented as hardware, firmware, software, or some combination thereof.

As shown, computing device 600 may include one or more processors or processor cores 602 and system memory 604. For the purpose of this application, including the claims, the terms "processor" and "processor cores" may be considered synonymous, unless the context clearly requires otherwise. The processor 602 may include any type of processors, such as a central processing unit (CPU), a microprocessor, and the like. The processor 602 may be implemented as an integrated circuit having multi-cores, e.g., a multi-core microprocessor. The computing device 600 may include mass storage devices 606 (such as diskette, hard drive, volatile memory (e.g., dynamic random-access memory (DRAM), compact disc read-only memory (CD-ROM), digital versatile disk (DVD), and so forth). In general, system memory 604 and/or mass storage devices 606 may be temporal and/or persistent storage of any type, including, but not limited to, volatile and non-volatile memory, optical, magnetic, and/or solid state mass storage, and so forth. Volatile memory may include, but is not limited to, static and/or dynamic random-access memory. Non-volatile memory may include, but is not limited to, electrically erasable programmable read-only memory, phase change memory, resistive memory, and so forth.

The computing device 600 may further include input/output (I/O) interface 608 to receive one or more I/O devices (such as a display (e.g., a touchscreen display), keyboard, cursor control, remote control, gaming controller, image capture device, and so forth) and communication interfaces 610 (such as network interface cards, modems, infrared receivers, radio receivers (e.g., Bluetooth), and so forth). For the illustrated embodiments, I/O interface 608 includes in particular, one or more USB controllers and ports incorporated with the power resource control technology as earlier described.

The communication interfaces 610 may include communication chips (not shown) that may be configured to operate the device 600 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 610 may operate in accordance with other wireless protocols in other embodiments.

The above-described computing device 600 elements may be coupled to each other via system bus 612, which may represent one or more buses. In the case of multiple buses, they may be bridged by one or more bus bridges (not shown). Each of these elements may perform its conventional functions known in the art. In particular, system memory 604 and mass storage devices 606 may be employed to store a working copy and a permanent copy of the programming instructions for implementing the operations of an operating system or one or more applications, collectively referred to as computational logic 622. The various elements may be implemented by assembler instructions supported by processor(s) 602 or high-level languages that may be compiled into such instructions.

The permanent copy of the programming instructions may be placed into mass storage devices 606 in the factory, or in the field, through, for example, a distribution medium (not shown), such as a compact disc (CD), or through communication interface 610 (from a distribution server (not shown)). That is, one or more distribution media having an implementation of the agent program may be employed to distribute the agent and to program various computing devices.

The number, capability, and/or capacity of the elements 608, 610, 612 may vary, depending on whether computing device 600 is used as a stationary computing device, such as a set-top box or desktop computer, or a mobile computing device, such as a tablet computing device, laptop computer, game console, or smartphone. Their constitutions are otherwise known, and accordingly will not be further described.

For one embodiment, at least one of processors 602 may be packaged together with computational logic 622 configured to practice aspects of optical signal transmission and receipt described herein to form a System in Package (SiP) or a System on Chip (SoC).

In various implementations, the computing device 600 may comprise one or more components of a data center, a laptop, a netbook, a notebook, an ultrabook, a smartphone, a tablet, a personal digital assistant (PDA), an ultra mobile PC, a mobile phone, or a digital camera. In further implementations, the computing device 600 may be any other electronic device that processes data.

Figure 7:
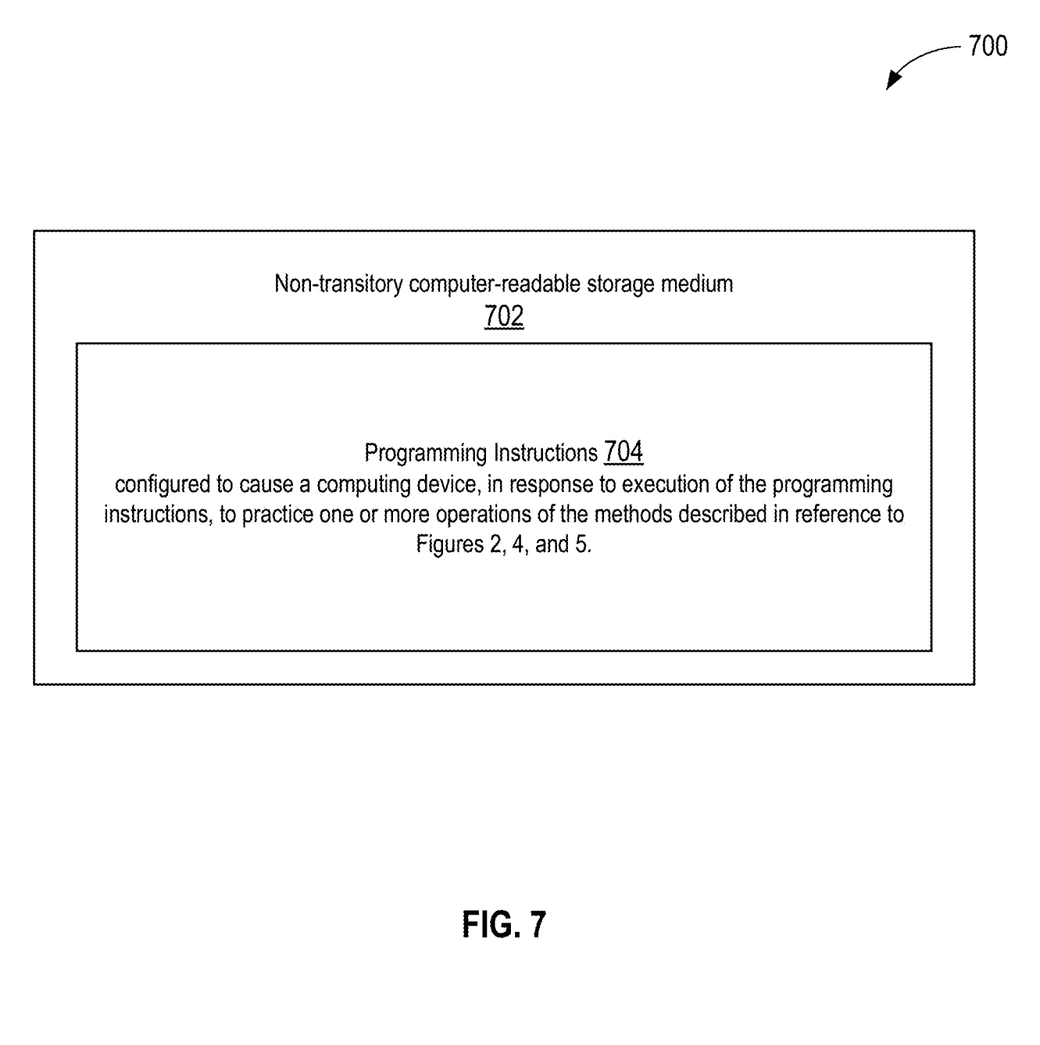
FIG. 7 illustrates an example computer-readable storage medium having instructions configured to implement all (or portion of) processes associated with FIGS. 2, 4, and 5, in accordance with various embodiments.

FIG. 7 illustrates an example computer-readable storage medium having instructions configured to implement all (or portion of) methods/processes of FIGS. 4 and 5 and additional processes performed by or in connection with a device policy manager (e.g., DPM 201 of FIG. 2), earlier described, in accordance with various embodiments. As illustrated, computer-readable storage medium 702 may include the executable code of a number of programming instructions or bit streams 704. Executable code of programming instructions (or bit streams) 704 may be configured to enable a component of a device, e.g., I/O interface 608 of computing device 600, in response to execution of the executable code/programming to perform (aspects of) methods/processes 400 and 500 of FIGS. 4 and 5, respectively. In alternate embodiments, executable code/programming instructions/bit streams 704 may be disposed on multiple non-transitory computer-readable storage medium 702 instead. In embodiments, computer-readable storage medium 702 may be non-transitory. In still other embodiments, executable code/programming instructions 704 may be encoded in transitory computer readable medium, such as signals.

Illustrative examples of the technologies disclosed herein are provided below. An embodiment of the technologies may include any one or more, and any combination of, the examples described below.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment are chosen and described in order to best explain the principles of the disclosure and the practical application, and to enable others of ordinary skill in the art to understand the disclosure for embodiments with various modifications as are suited to the particular use contemplated.

Example 1 may include a universal serial bus (USB) controller comprising: a USB-C port to be coupled to a USB link including one or more high speed data lines and a line used by an alternate mode function to carry low power commands related to an alternate mode function of the USB-C port; and a processor to couple to the USB-C port to: monitor the line used by the alternate mode function for the low power commands; and provide information about the low power commands to a device policy manager (DPM) arranged to determine a power distribution policy for a plurality of devices to be coupled to the DPM, wherein the power distribution policy is to supplement or replace a low power policy of at least a first device of the plurality of devices using a USB-C/Power delivery policy and a second device of the plurality of devices using an alternate mode low power policy.

Example 2 may include the USB controller of Example 1, and/or some other examples herein, wherein the alternate mode function is associated with an alternate mode of the one or more high speed data lines to carry high-speed signals different from default USB 3.0 signals.

Example 3 may include the USB controller of Example 1, and/or some other examples herein, wherein to determine the power distribution policy by the DPM comprises to manage, by the DPM, low power states for the plurality of devices and wherein the alternate mode low power policy is associated with a DisplayPort (DP), High-Definition Multimedia Interface (HDMI), Thunderbolt, or other vendor alternate mode.

Example 4 may include the USB controller of Example 1, and/or some other examples herein, wherein the low power commands include commands indicating entry or exit of a low power state of the first device or the second device.

Example 5 may include the USB controller of Example 1, and/or some other examples herein, wherein the line used by the alternate mode function includes an auxiliary line or a side-band use (SBU) line.

Example 6 may include the USB controller of Example 1, and/or some other examples herein, wherein to monitor the line used by the alternate mode function includes to physically monitor the line by checking a hardware register or detecting an interrupt indicating entry or exit of low power states Example 7 may include the USB controller of Example 1, and/or some other examples herein, wherein to monitor the line used by the alternate mode function includes to monitor the line by soft methods including callback registration.

Example 8 may include the USB controller of Example 1, and/or some other examples herein, wherein the DPM to determine a power distribution policy includes to change a power requirement for a device of the plurality of devices or renegotiate a power contract with the device.

Example 9 may include the USB controller of Examples 1-8, and/or some other examples herein, wherein the USB-C port comprises a data downstream facing port (DFP) and a power source or a data DFP and a power sink.

Example 10 may include the USB controller of any one of Examples 1-9, and/or some other examples herein, wherein the plurality of devices includes at least one or more peripheral devices associated with a USB-C/Power delivery specification and a display device associated with a DisplayPort alternate mode.

Example 11 may include a method of managing power states for a USB-C/USB power delivery system, comprising: detecting, by a USB controller, whether the USB-C/USB power delivery system has entered a mode to transmit or receive signals associated with an alternate mode; monitoring, by the USB controller, power commands of the alternate mode on an alternate mode function line to gather low power state information; and providing, by the USB controller, the low power state information to a device policy manager (DPM) to manage the power distribution policy for the USB-C/USB power delivery system.

Example 12 may include the method of Example 11, wherein providing, by the USB controller, the low power state information to a device policy manager to manage the power distribution policy includes providing the information to a DPM coupled to at least a first device associated with a default USB-C/Power delivery policy and a second device associated with a default alternate mode low power policy.

Example 13 may include the method of Example 11, wherein monitoring, by the USB controller, power commands of the alternate mode includes monitoring a side-band use (SBU) or auxiliary line in a USB link for low power entry or exit commands.

Example 14 may include the method of Example 11, wherein monitoring, by the USB controller, power commands of the alternate mode includes to physically monitor the alternate mode function line by checking a hardware register or detecting an interrupt indicating entry or exit of low power states Example 15 may include the method of Example 11, wherein monitoring, by the USB controller, power commands of the alternate mode on the alternate mode function line includes to monitor the line by callback registration.

Example 16 may include the method of Example 11, wherein detecting, by the USB controller, whether the USB-C/USB power delivery system has entered a mode to transmit or receive signals associated with the alternate mode, comprises detecting that the system has entered a DisplayPort (DP), High-Definition Multimedia Interface (HDMI), Thunderbolt, or other vendor alternate mode.

Example 17 may include the method of Example 16, further comprising enabling, by the USB controller, detection of entry or exit of low power modes of at least a first and a second device coupled to the DPM.

Example 18 may include the method of any one of Examples 11-17, wherein providing, by the USB controller, the low power state information includes providing the low power state information to the device policy manager (DPM) to allow the DPM to change a power requirement for a device of the plurality of devices or renegotiating a power contract with the device.

Example 19 may include the method of any one of Examples 11-17, further comprising detecting, by the USB controller, whether the USB-C port comprises a data downstream facing port (DFP) and a power source or a data DFP and a power sink.

Example 20 may include the method of any one of Example 11-17, wherein the alternate mode includes an alternate mode for transmitting DisplayPort video data over a USB-C link.

Example 21 may include an apparatus comprising means for performing the method of any one of Examples 11-20, or some other example herein Example 22 may include one or more computer-readable media having instructions that, when executed by one or more processors of a computer device, cause the computer device to detect whether a USB-C/USB power delivery system has entered a mode to transmit or receive signals associated with an alternate mode; monitor power commands of the alternate mode on an alternate mode function line to gather low power state information; and provide the low power state information to a device policy manager (DPM) to manage the power distribution policy for the USB-C/USB power delivery system.

Example 23 may include the one or more computer-readable media of Example 22, and/or some other Examples herein, wherein the computer device, in response to execution of the instructions, is to monitor power commands of the alternate mode by monitoring a side-band use (SBU) or auxiliary line in a USB link for low power entry or exit commands.

Example 24 may include the one or more computer-readable media of Example 22, and/or some other examples herein, wherein the computer device, in response to execution of the instructions, is to monitor power commands by callback registration.

Example 25 may include the one or more computer-readable media of Example 22, and/or some other Examples herein, wherein the computer device, in response to execution of the instructions, is to detect whether the USB-C/USB power delivery system has entered a mode to transmit or receive signals associated with the alternate mode, comprises detecting that the system has entered a DisplayPort (DP), High-Definition Multimedia Interface (HDMI), Thunderbolt, or other vendor alternate mode.

Example 26 may include the one or more computer-readable media of Example 22, and/or some other Examples herein, wherein the computer device, in response to execution of the instructions, is to enable detection of entry or exit of low power modes of at least a first and a second device coupled to the DPM.

Example 27 may include the one or more computer-readable media of Example 22, and/or some other Examples herein, wherein the computer device, in response to execution of the instructions, is further to provide the low power state information to the device policy manager (DPM) to allow the DPM to change a power requirement for a device of the plurality of devices or renegotiate a power contract with the device.

Example 28 may include the one or more computer-readable media of Example 22, and/or some other Examples herein, wherein the computer device, in response to execution of the instructions, is further to detect whether the USB-C port comprises a data downstream facing port (DFP) and a power source or a data DFP and a power sink.

Example 29 may include the one or more computer-readable media of Examples 22-28, and/or some other Examples herein, wherein the computer device, in response to execution of the instructions includes to detect an alternate mode for transmitting DisplayPort video data over a USB-C link.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

What is claimed is:

1. A universal serial bus (USB) controller comprising:
   a USB-C port to be coupled to a USB link including one or more high speed data lines and a line used by an alternate mode function to carry low power commands related to an alternate mode function of the USB-C port; and
   a processor to couple to the USB-C port to:
   monitor the line used by the alternate mode function for the low power commands, which includes to:
   detect a low power command associated with a device coupled to the USB link, wherein the low power command includes a command that indicates an entry or exit of a low power state by the device;
   determine whether the command is associated with a Host or Display Source;
   provide information about the low power commands to a device policy manager (DPM) arranged to determine a power distribution policy for a plurality of devices to be coupled to the DPM, including the device coupled to the DPM via the USB link; and
   assist the DPM in changing the power distribution policy, which includes, for the device:
   if the command is associated with a Host or Display Source that is concurrently a power source, redistribute power according to available voltage provided by a configuration channel (CC) signal line that is included in the USB link; and
   if the command is associated with the Host or Display Source that is concurrently a power sink, renegotiate a power contract with the power source, according to a USB-C suspend policy, and cause the USB-C port to enter into a low power mode.

2. The USB controller of claim 1, wherein the power distribution policy by the DPM comprises an alternate mode low power policy that is associated with a DisplayPort (DP), High-Definition Multimedia Interface (HDMI), Thunderbolt, or other vendor alternate mode.

3. The USB controller of claim 1, wherein the line used by the alternate mode function includes an auxiliary line or a side-band use (SBU) line.

4. The USB controller of claim 1, wherein to monitor the line used by the alternate mode function includes to physically monitor the line by checking a hardware register or detecting an interrupt indicating entry or exit of low power states.

5. The USB controller of claim 1, wherein to monitor the line used by the alternate mode function includes to monitor the line by soft methods including callback registration.

6. The USB controller of claim 1, wherein the USB-C port comprises a data downstream facing port (DFP) and the power source or a data DFP and the power sink.

7. The USB controller of claim 1, wherein the plurality of devices includes at least one or more peripheral devices associated with a USB-C/Power delivery specification and a display device associated with a DisplayPort alternate mode.

* * * * *